United States Patent [19]

Hackel

[11] Patent Number: 5,166,941
[45] Date of Patent: Nov. 24, 1992

[54] SINGLE MODE PULSED DYE LASER OSCILLATOR

[75] Inventor: Richard P. Hackel, Livermore, Calif.

[73] Assignee: The United States of America as represented by the United States Department of Energy, Washington, D.C.

[21] Appl. No.: 915,166

[22] Filed: Sep. 25, 1986

[51] Int. Cl.$^5$ .............................. H01S 3/08
[52] U.S. Cl. .......................... 372/9; 372/19; 372/54; 372/100; 372/102
[58] Field of Search ............ 372/9, 19, 54, 100, 372/102; 330/4.3

[56] References Cited

U.S. PATENT DOCUMENTS 4,016,504  4/1977  Klauminzer .................. 372/102 X Primary Examiner—Mark Hellner
Attorney, Agent, or Firm—Roger S. Gaither; Miguel A. Valdes; William R. Moser

[57] ABSTRACT

A single mode pulsed dye laser oscillator is disclosed. The dye laser oscillator provides for improved power efficiency by reducing the physical dimensions of the overall laser cavity, which improves frequency selection capability.

7 Claims, 2 Drawing Sheets

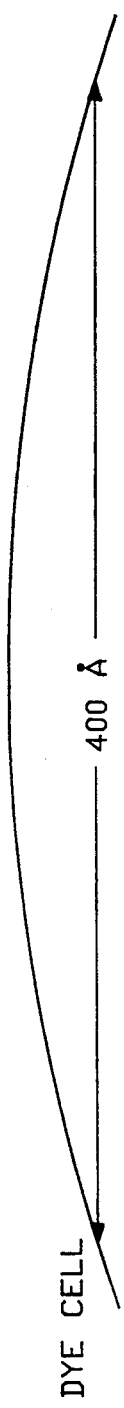
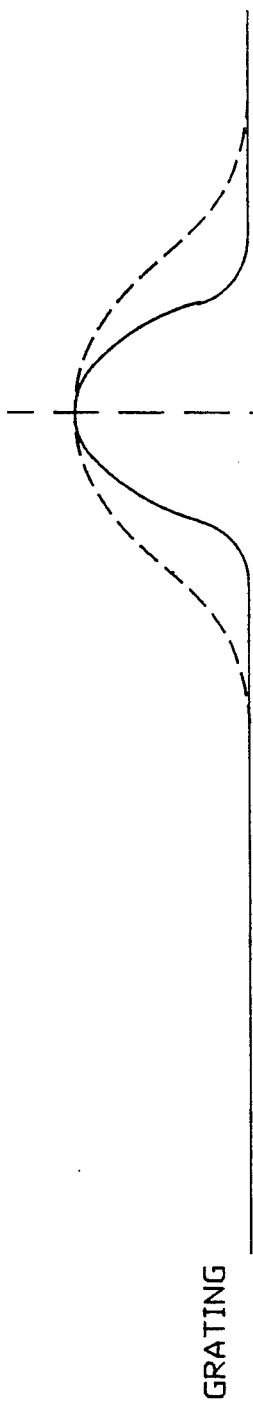
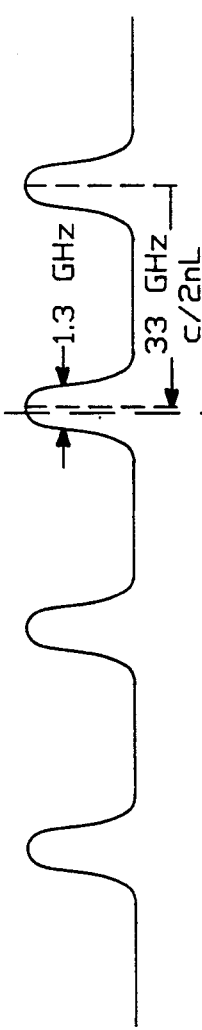
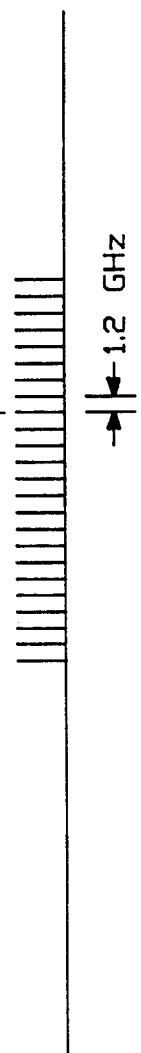
FIG.-2A DYE CELL
FIG.-2B GRATING
FIG.-2C ETALON
FIG.-2D OVERALL RESPONSE

SINGLE MODE PULSED DYE LASER OSCILLATOR

FIELD OF THE INVENTION

The United States Government has rights in this invention pursuant to Contract No. W-7405-ENG-48 between the United States Department of Energy and University of California for the operation of the Lawrence Livermore National Laboratory.

CROSS REFERENCE TO RELATED APPLICATION

1. Master Dye Laser Oscillator Including a Specific Grating Assembly For Use Therewith, invented by James Davin and assigned to the same assignee as the present application.

BACKGROUND OF THE INVENTION

The present invention relates to a single mode pulsed dye laser oscillator.

In the laser art, there is an ever increasing requirement for higher power efficiency capabilities (ratio of power out to power in). There are also ever increasing requirements for smaller and more compact design of single mode pulsed dye lasers. There are several problems inherent in attempting to achieve the combination of higher power efficiency and more compact design.

One problem with single mode pulsed dye lasers is that increasing applied power creates multiple mode outputs rather than single mode selection as desired.

Consequently, it becomes difficult to design a single mode pulsed dye laser oscillator with increased power efficiency capabilities while at the same time reducing the overall physical dimensions and maintaining operation within a narrow bandwidth (e.g., single mode operation).

In an article published in Applied Physics in 1981 entitled "Design Criteria and Operating Characteristics of a Single Mode Pulsed Dye Laser," there is described therein a dye laser which utilizes a combination of a diffraction grating, an etalon, a beam expander, a dye cell and an output mirror in combination. That dye laser is pumped by a 6 KHz copper vapor laser to produce up to 230 mW average power at over five percent efficiency when converting pump energy into a high quality, single mode output beam. The cavity dimensions of that dye laser are approximately 202 mm.

The laser described in the Applied Physics article includes a multi-prism beam expander wherein four prisms are utilized. While the approach described in the Applied Physics article aids in reducing the size of the physical dimensions of the laser itself, nevertheless there are certain inherent limitations with a four prism approach, particularly with respect to reducing the cavity dimensions.

Alternative beam expander capabilities are known in the prior art wherein one, two or more prisms are arranged to provide for beam expansion. For instance, U.S. Pat. No. 4,016,504 describes a multiple prism beam expander wherein a pair of prisms of substantially the same size are positioned relative to one another to provide a magnification factor of approximately twenty. However, the dimensions illustrated in the '504 patent are comparatively large, with cavity dimensions of 180 mm.

SUMMARY OF THE INVENTION

It is an object of the present invention to provide an improved single mode pulsed dye laser oscillator.

It is a further object of the present invention to provide a single mode pulsed dye laser with significantly reduced physical cavity dimensions.

It is another object of the present invention to provide a single mode pulsed dye laser oscillator with higher power efficiency characteristics.

It is still another object to provide an improved dye laser oscillator having quicker turn-on (switching) capabilities.

The improved single mode pulsed dye laser oscillator includes dye cell means located within a laser cavity of short dimensions. The dye cell is pumped by a pulsed copper vapor laser beam and generates an amplified laser beam having a predetermined band wavelength which is propagated lengthwise through the cavity.

The dye laser oscillator also includes beam expander means for expanding the amplified laser beam to form an expanded laser beam with a magnification factor, in one embodiment, of approximately forty. The beam expander means include a pair of prisms optically arranged to provide for expansion of the amplified laser beam, one of the prisms being substantially larger than the other prism. Desirably, the angle of incidence of both of the pair of prisms to the propagated laser beam is approximately 83.1 degrees, while the exit angle of the laser beam from the prism face is approximately 9.7 degrees.

The dye laser oscillator also includes grating means positioned for reflecting a predetermined range of the bandwidth of the expanded laser beam lengthwise back through the cavity and an etalon means for filtering the reflected expanded beam to select a narrower range from the reflected expanded beam. The dye laser oscillator also includes an output coupling means in the form of a mirror with a suitable reflective coating to couple the reflected, expanded and narrowed beam out from the cavity.

Additional objects, advantages and novel features of the present invention will be set forth in part of the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 2A-2D depict frequency response curves for the various components of FIG. 1.

DETAILED DESCRIPTION OF THE DRAWINGS

Reference will now be made in detail to the preferred embodiment of the invention, an example of which is illustrated in the accompanying drawings. While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
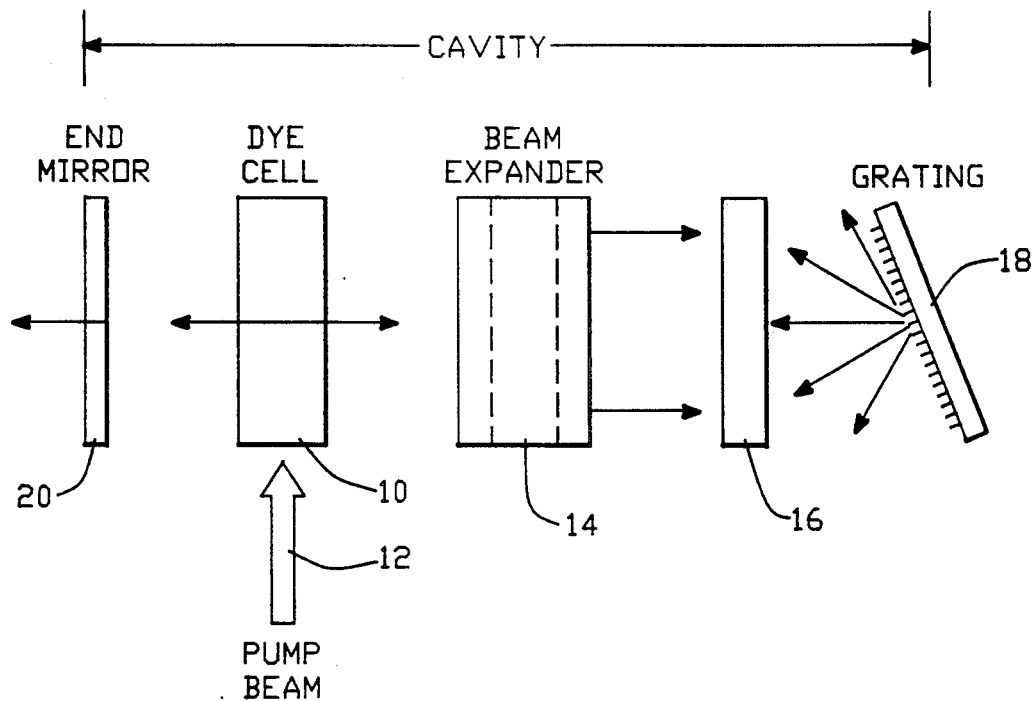
FIG. 1 depicts a block diagram of a single mode pulsed dye laser oscillator.

Referring now to FIG. 1, a block diagram of a single mode pulsed dye laser oscillator is depicted.

In FIG. 1, a dye cell 10 is located within a laser cavity 22. Dye cell 10 is optically pumped with a copper vapor laser beam 12 through known techniques. In a preferred embodiment, the pulsed copper vapor laser beam 12 typically has a wavelength of 5106 Angstroms (A) at a pulse repetition rate of 5 KHz or higher. However, the present invention is believed capable of operating within a range of 4000-8000 angstroms.

The function of dye cell 10 in FIG. 1 is to generate a narrow, amplified laser beam having a wavelength of approximately 5700 A which is input to beam expander 14.

The function of beam expander 14 is to expand the beam from laser dye cell 10 to form an expanded beam having a magnification factor on the order of forty. The beam is expanded in one dimension or along one axis. As will be described, beam expander 14 in FIG. 1 utilizes a pair of prisms optically arranged to expand the amplified narrow beam from dye cell 10.

The expanded beam from expander 14 is input through etalon 16 to grating means 18, which is in what is known as Littrow mount configuration. Grating means 18 is optically arranged to reflectively select a narrower bandwidth of wavelengths from the expanded beam, and these reflected beams are input back through the cavity 22 including etalon 16, beam expander 14, dye cell 10 and to output coupling means 20.

Desirably, output coupling means 20 is a mirror with a suitable reflective coating coefficient of approximately 30 percent. Coupling means 20 couples the expanded and selected laser beam out of cavity 22. If other operating wavelengths are desired or required, all that is generally necessary is to provide a suitable reflection coating coefficient, dependent upon the dye cell requirements.

In order to more clearly understand the phenomenon occurring within the single mode pulse dye laser oscillator of FIG. 1, reference is now made to FIGS. 2A-2D, wherein a spectral diagram illustrating the frequency selections of the individual components of FIG. 1 is depicted.

An understanding of FIGS. 2A-2D will greatly aid in understanding the operation of the single mode pulsed dye laser oscillator of FIG. 1. In FIGS. 2A-2D, the horizontal axis represents wavelength and the vertical axis represents the frequency response of the particular components of FIG. 1.

FIG. 2A illustrates the frequency response curve of dye cell 10 of FIG. 1. Typically, the narrow beam output from dye cell 10 of FIG. 1 will have a frequency spectral response of approximately four hundred Angstroms (400 A). As illustrated in FIG. 2A, the output of dye cell 10 has a frequency response of approximately 400 A. The expanded beam from beam expander 14 is then input through etalon 16 to grating means 18. As illustrated in FIG. 2B, grating means 18 provides an improved frequency selection on the order of one-eighth (⅛) Angstrom.

The free spectral range (FSR) of etalon 16 is approximately 33 GHz and is illustrated in FIG. 2C (the range between the resonance peaks) and the linewidth (the full width of each resonance "bump" at the half-maximum value) is approximately 1.3 GHz. Thus, the finesse of etalon 16 (the ratio of FSR/linewidth) is approximately 25.

As illustrated in FIG. 2C, etalon 16 provides even more refined frequency selection wherein the frequency selective capability of etalon 16 is on the order of a magnitude of 1.3 GHz or approximately one-sixtieth (1/60) Angstrom.

The overall frequency response of cavity 22 of FIG. 1 thus can be designed to be on the order of magnitude of 1.2 GHz or approximately one-seventieth (1/70) of an Angstrom (83 GHz approximately equals one Angstrom).

Frequency response characteristics for a single mode pulsed dye laser oscillator are known, and are responsive to the equation wavelength=C/2NL, where C is the velocity of light, N is the refractive index, and L is the physical length of the cavity. It can be seen that increasing the optical length will have an inverse effect on the overall frequency selection capability of the dye laser oscillator depicted in FIG. 1.

For instance, by modifying the physical parameters of the grating means 18 there is an inverse effect on the selection capability and therefore the single mode operation of the dye laser of FIG. 1.

Similarly, because of the physical characteristics of etalon 16, the frequency response as depicted in FIG. 2C can be modified depending upon the physical characteristics of etalon 16 of FIG. 1.

The overall frequency response of the dye laser as depicted in FIG. 2D is also affected by the same general equation above. Consequently, by decreasing the overall width of cavity 22, there will be a higher frequency selection capability of the dye pulsed laser of FIG. 1.

As previously described, it is desirable to provide increased power efficiency capabilities with the present invention. A problem with applying increased power to dye cell 10 of FIG. 1 results in overall "shifting" or "translation" of the frequency response curves depicted in FIG. 2. For instance, increased power applied to the dye cell of FIG. 1 will result in increased power in the laser beam applied to grating and etalon of FIG. 1. Consequently, there will be a "shifting" or "widening" of the grating selection response curve in FIG. 2B so that it could encompass the resonances depicted in FIG. 2C as a consequence of the increased power. This is illustrated by the dotted lines in FIG. 2B. This aspect would unfortunately affect the single mode capability of the present invention as there would be in effect more than one resonance "window" of FIG. 2C contained within the envelope depicted in FIG. 2B.

This particular deficiency can be overcome by ensuring that the overall dimensions of the cavity itself are minimized as much as possible (note that wavelength×C/2NL) in order to provide for a single mode pulsed dye laser oscillator, By reducing the overall dimensions of cavity 22 in FIG. 1, it can be seen that the desired single mode characteristic can be maintained, the FSR and finesse can be increased, while at the same time providing for capability of increased power efficiency. In particular, FIG. 2A can be viewed as an effective "gain" curve and FIGS. 2B, 2C and 2D can be viewed as effective "loss" curves.

By increasing the overall gain curve 2A, eventually additional modes of operation will be introduced. It is desired that the effective "gain" should always be less than the effective "loss" at all points in FIG. 2 except at the desired lasing frequency.

By decreasing the overall cavity length, more power can be input into the oscillator while maintaining the efficiency of etalon 16. Moreover, another advantage with a shorter cavity is shorter transmission time for the photons within the laser beam propagated within the cavity. This advantage of shorter transmission time provides for quicker switching capabilities.

In the preferred embodiment of the present invention, this reduction in cavity dimensions can be aided by reducing the size of the beam expander.

According to the present invention, a two-prism beam expander is provided which will reduce the overall dimensions of the beam expander and consequently reduce the overall dimensions of the cavity itself.

Figure 3:
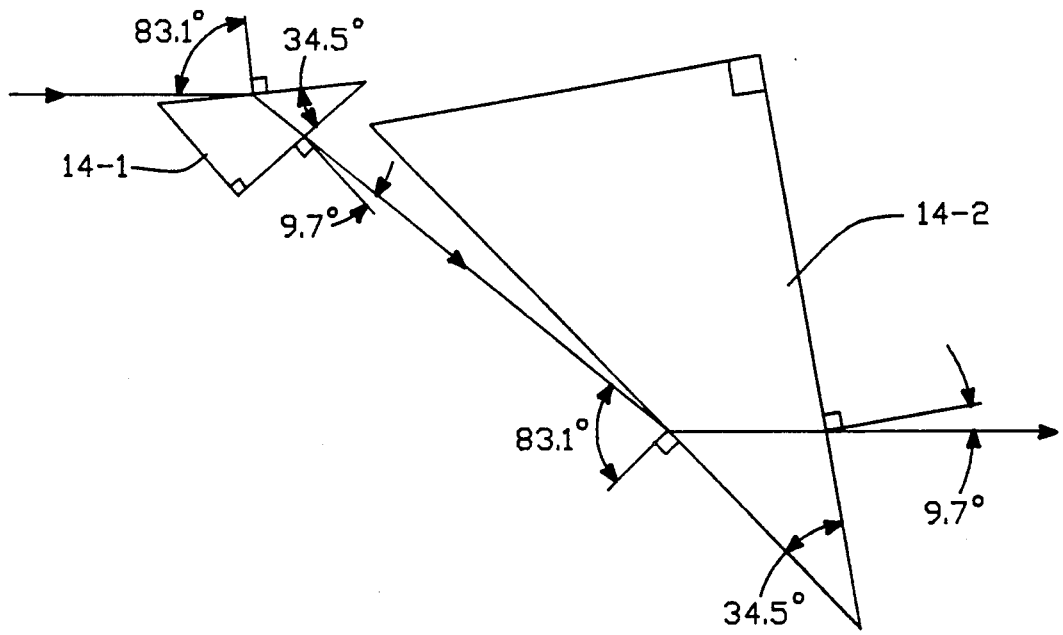
FIG. 3 depicts a ray trace for a two-prism expander which forms a portion of FIG. 1.

Referring now to FIG. 3, a diagram of a ray trace for a two-prism beam expander according to the present invention is depicted.

In. FIG. 3, the laser beam from dye cell 10 of FIG. 1 is input to a first prism 14-1 at an angle of incidence of approximately 83.1 degrees (with respect to the perpendicular axis).

The input beam is expanded through prism 14-1 and input to second prism 14-2 with approximately the same angle of incidence (83.1 degrees). It can be seen that the first prism 14-1 which is incident to the input beam is substantially smaller than the second prism 14-2. This difference in size again aids in reducing the overall physical dimensions of the cavity, and consequently the dye laser itself by minimizing the axial extent of the beam expander section.

The second prism 14-2 further expands the beam to form the expanded beam which is output through etalon 16 and grating means 18 of FIG. 1.

As illustrated in FIG. 3, the angles are indicated correctly, but it should be noted that the dimensions and angles are not necessarily drawn to scale.

Each prism 14-1, 14-2 in FIG. 3 has a magnification factor of approximately 6.3, and it can be seen that the overall magnification factor is approximately forty.

By arranging the two prisms as illustrated in FIG. 3 with an angle of incidence of approximately 83.1 degrees, the overall physical dimensions of the single mode pulsed dye laser cavity can be greatly reduced, thereby providing for a smaller physical embodiment while at the same time providing for increased single mode selection capability. The expanded beams exit each prism 14-1, 14-2 at an angle of approximately 9.7 degrees. It has been observed that an exit angle which is orthogonal to the face of the prisms could generate reflections back into the cavity which could generate extraneous modes of operation. With an exit angle of approximately 9.7 degrees from the orthogonal, the reflections are not reflected back into the cavity, so that the extraneous modes are not generated.

As a specific example, Table I below illustrates the optical dimensions of the improved laser cavity and its components.

TABLE I

| Component | Optical Dimension |
|---|---|
| End Mirror to Dye Cell | 5 mm |
| Dye Cell (total) | 19.8 |
| Cell to Prism | 3.5 |
| Beam Expander | 20. |
| Prism to Grating | 23.5 |
| Etalon | 45. |
| Total | 117. mm |

As can be seen in Table I above, the cavity dimensions of the invention are significantly reduced as contrasted with the prior art. The specific mechanical configuration of one embodiment of a pulsed dye laser is described in more detail in the cross-examined application identified above, the details of which are hereby incorporated by reference.

By recognizing the inherent deficiencies of the prior art, in conjunction with the illustrations depicted in FIG. 2, the present invention provides for an improved power efficiency capability (permitting higher power inputs to the dye cell of FIG. 1) while at the same time significantly reducing the overall dimensions of the laser cavity.

The foregoing description of the preferred embodiment of the invention is presented for purposes of illustration and description. It is not intended to be exhaustive or to limit the invention to the precise form disclosed, and obviously many modifications and variations are possible in light of the above teaching. For instance, although copper vapor laser input beams are desired in the preferred embodiment other types of metal vapor laser input beams could be utilized. Also, although a pulsed dye laser oscillator is disclosed, it is believed that the principles of the present invention could be applied to continuous wave laser oscillator applications. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

What is claimed is:

1. A single mode pulsed dye laser oscillator comprising
   dye cell means located within a laser cavity and responsive to a pulsed metal vapor laser input beam for generating and propagating an amplified pulsed laser beam having a predetermined wavelength lengthwise through said cavity,
   beam expander means for expanding said beam to form an expanded laser beam where the expansion factor is approximately forty, said expander means including a pair of first and second prisms optically arranged to provide for expansion of said amplified laser beam wherein the first of said prisms incident to said laser beam is substantially smaller than the second of said prisms, and wherein each of said pair of prisms has an angle of incidence to said amplified laser beam of approximately 83.1 degrees,
   grating means reflectively positioned for reflecting a predetermined bandwidth of said expanded laser beam lengthwise back through said cavity, and
   etalon means for selecting a further narrower bandwidth from said reflected expanded beam to form a single mode pulsed laser beam, wherein said expanded beam has an exit angle to each of said pair of prisms away from the orthogonal axis of approximately 9.7 degrees with respect to the orthogonal axis in order to avoid generating extraneous modes of operation, and wherein the optical length of said laser cavity is approximately 117 millimeters.

2. A single mode pulsed dye laser oscillator as in claim 1 further including output coupling means for coupling said expanded narrowed beam out of said laser cavity.

3. A single mode dye laser oscillator comprising:

dye cell means located within a laser cavity and responsive to a laser input beam for generating and propagating an amplifier pulsed laser beam having a predetermined wavelength lengthwise through said cavity, beam expander means for expanding said beam to form an expanded laser beam where the expansion factor is approximately forty said expander means including a pair of first and second prisms optically arranged to provide for expansion of said amplified laser beam wherein the first of said prisms incident to said laser beam is substantially smaller than the second of said prisms, and wherein each of said pair of prisms has an angle of incidence to said amplified laser beam of approximately 83.1 degrees, grating means reflectively positioned for reflecting a predetermined bandwidth of said expanded laser beam lengthwise back through said cavity, and etalon means for selecting a further narrower bandwidth from said reflected expanded beam to form a single model pulsed laser beam wherein said expanded beam has an exit angle to each of said pair of prisms away from the orthogonal axis of approximately 9.7 degrees with respect to the orthogonal axis in order to avoid generating extraneous modes of operation, and output coupling means for coupling said expanded narrowed beam out of said laser cavity wherein the optical length of said laser cavity is approximately 117 millimeters.

4. A single mode dye laser oscillator as in claim 3 wherein said input laser beam is a pulsed input beam.

5. A single mode dye laser oscillator as in claim 4 wherein said input laser beam is a metal vapor beam.

6. A single mode dye laser oscillator as in claim 5 wherein said metal vapor beam is a copper vapor laser beam.

7. A single mode dye laser oscillator as in claim 3 wherein said input laser beam is a continuous wave beam.

* * * * *